US012603794B2

(12) United States Patent
Griffin et al.

(10) Patent No.: US 12,603,794 B2
(45) Date of Patent: Apr. 14, 2026

(54) COMPUTER VISION DRIVEN ACTIONS BASED ON USER AVAILABILITY DURING VIDEO CONFERENCES

(71) Applicant: Cisco Technology, Inc., San Jose, CA (US)

(72) Inventors: Keith Griffin, County Galway (IE); William Edward Reed, Tiburon, CA (US); Dario Cazzani, New York, NY (US)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 18/377,178

(22) Filed: Oct. 5, 2023

(65) Prior Publication Data

US 2024/0137237 A1 Apr. 25, 2024
US 2024/0235871 A9 Jul. 11, 2024

Related U.S. Application Data

(60) Provisional application No. 63/418,694, filed on Oct. 24, 2022.

(51) Int. Cl.
*H04L 12/18* (2006.01)
*G06F 3/01* (2006.01)
(Continued)

(52) U.S. Cl.
CPC .......... *H04L 12/1822* (2013.01); *G06F 3/013* (2013.01); *G06F 3/014* (2013.01);
(Continued)

(58) Field of Classification Search
CPC ............................ H04L 12/1822; G06V 40/23
See application file for complete search history.

(56) References Cited

U.S. PATENT DOCUMENTS 8,189,046 B2 5/2012 Robinson et al.
9,313,454 B2 4/2016 Lalonde et al.
(Continued)

FOREIGN PATENT DOCUMENTS

WO 2022101451 5/2022

OTHER PUBLICATIONS

Vakunov, et al., "MediaPipe Iris: Real-time Iris Tracking & Depth Estimation", online: https://blog.research.google/2020/08/mediapipe-iris-real-time-iris-tracking.html, accessed Aug. 31, 2023, 9 pages.

*Primary Examiner* — Amal S Zenati
(74) *Attorney, Agent, or Firm* — Lee & Hayes, P.C.

(57) ABSTRACT

In one embodiment, a method is disclosed comprising: analyzing, by a process, real-time video of a user participating on a video conference; determining, by the process and based on analyzing, a level of engagement of the user to the video conference; detecting, by the process, that the level of engagement of the user to the video conference is below a given threshold of engagement for a minimum length of time, wherein the minimum length of time is configurable based on one or more engagement indicators; and enacting, by the process, one or more video conference privacy measures for the user within the video conference in response to the level of engagement being below the given threshold of engagement for the minimum length of time.

20 Claims, 12 Drawing Sheets

(51) Int. Cl.
   *G06T 5/70*          (2024.01)
   *G06V 40/20*        (2022.01)

(52) U.S. Cl.
   CPC ................ *G06T 5/70* (2024.01); *G06V 40/23*
                (2022.01); *G06T 2207/30201* (2013.01)

(56)                References Cited

U.S. PATENT DOCUMENTS

|  |  |  |  |
|---|---|---|---|
| 11,294,474 B1 | 4/2022 | Stewart et al. | |
| 2005/0099492 A1* | 5/2005 | Orr ........................ | H04N 7/147 |
| | | | 348/E7.083 |
| 2006/0023915 A1 | 2/2006 | Aalbu et al. | |
| 2022/0239848 A1* | 7/2022 | Swierk ................... | H04N 7/152 |

* cited by examiner

300

COLLABORATION ENDPOINT 302

CAMERA(S) 308

SPEAKER(S) 306

DISPLAY 304

Connecting...

CONTROL DISPLAY 310

COMPUTER VISION DRIVEN ACTIONS BASED ON USER AVAILABILITY DURING VIDEO CONFERENCES

RELATED APPLICATION

This application claims priority to U.S. Prov. Appl. Ser. No. 63/418,694, filed Oct. 24, 2022, entitled COMPUTER VISION DRIVEN ACTIONS BASED ON USER AVAILABILITY DURING VIDEO CONFERENCES, by Griffin, et al., the contents of which are incorporated herein by reference.

TECHNICAL FIELD

The present disclosure relates generally to computer networks, and, more particularly, to computer vision driven actions based on user availability during video conferences.

BACKGROUND

Meeting attendees for video conferences often step away temporarily without taking any action to secure their audio or video position. This can result in security, data privacy, and/or personal, or otherwise sensitive, information leaks. For example, if someone walks away for a short personal call without muting, the call details can end up in the meeting audio. The occurrence of undesirable incidents has increased dramatically in the past few years, particularly due to the increase in at-home working, and video conferencing systems have not yet provided an intelligent solution.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an illustrative method herein provides for computer vision driven actions based on user availability during video conferences. In particular, techniques herein provide a system to enhance user privacy and minimize unintended consequence based on a user's temporary absence or distraction during a collaboration session.

In one embodiment, a method is disclosed comprising: analyzing, by a process, real-time video of a user participating on a video conference; determining, by the process and based on analyzing, a level of engagement of the user to the video conference; detecting, by the process, that the level of engagement of the user to the video conference is below a given threshold of engagement for a minimum length of time, wherein the minimum length of time is configurable based on one or more engagement indicators; and enacting, by the process, one or more video conference privacy measures for the user within the video conference in response to the level of engagement being below the given threshold of engagement for the minimum length of time.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example communication network.
Figure 1:
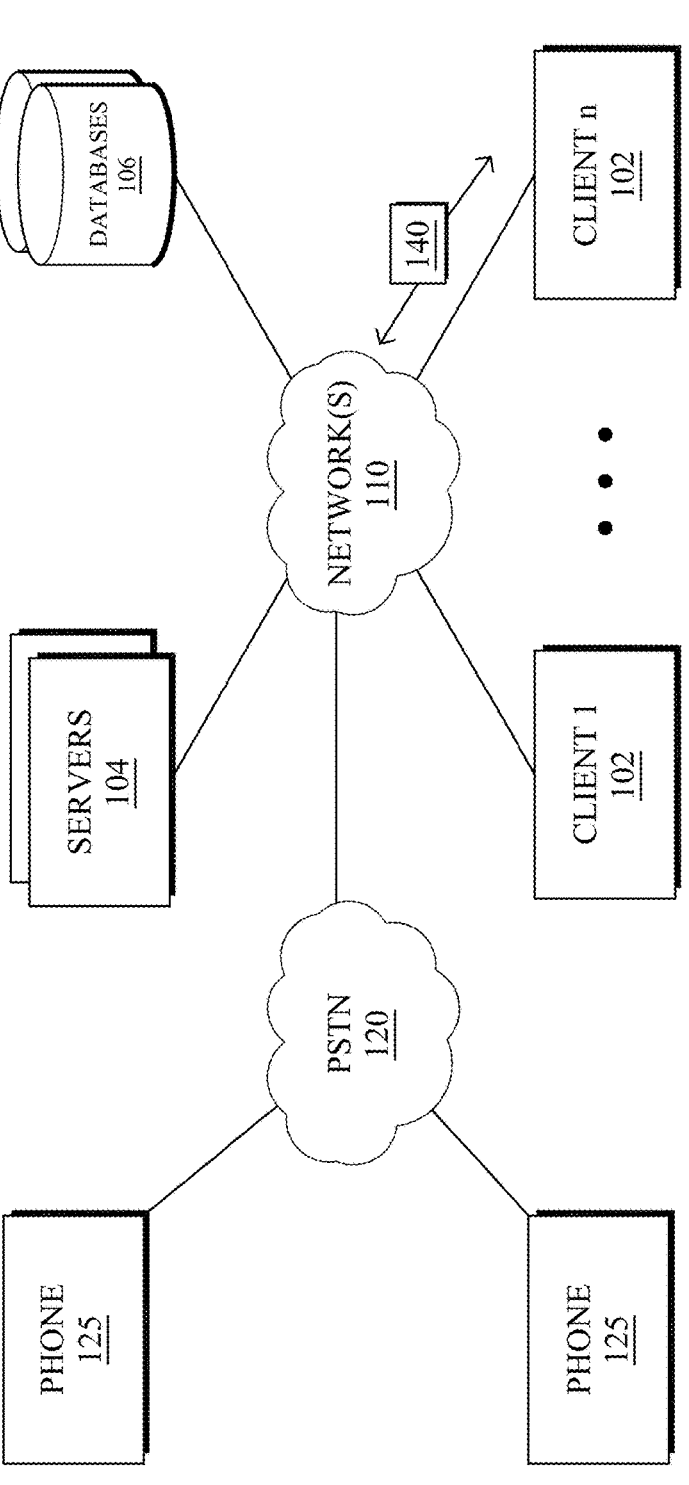

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, collaboration endpoints, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

In addition, a separate public switched telephone network (PSTN) 120 may also be considered to be a part of computing system 100, namely where phones 125 connect to the PSTN 120 in a standard manner (e.g., landlines, cellphones, and so on). The PSTN may be based on any number of carrier telephone networks which provide a connection to computer network 110 for things such as conference calls, video calls, calls to voice over IP (VoIP) end points, and so on, as will be readily understood by those skilled in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
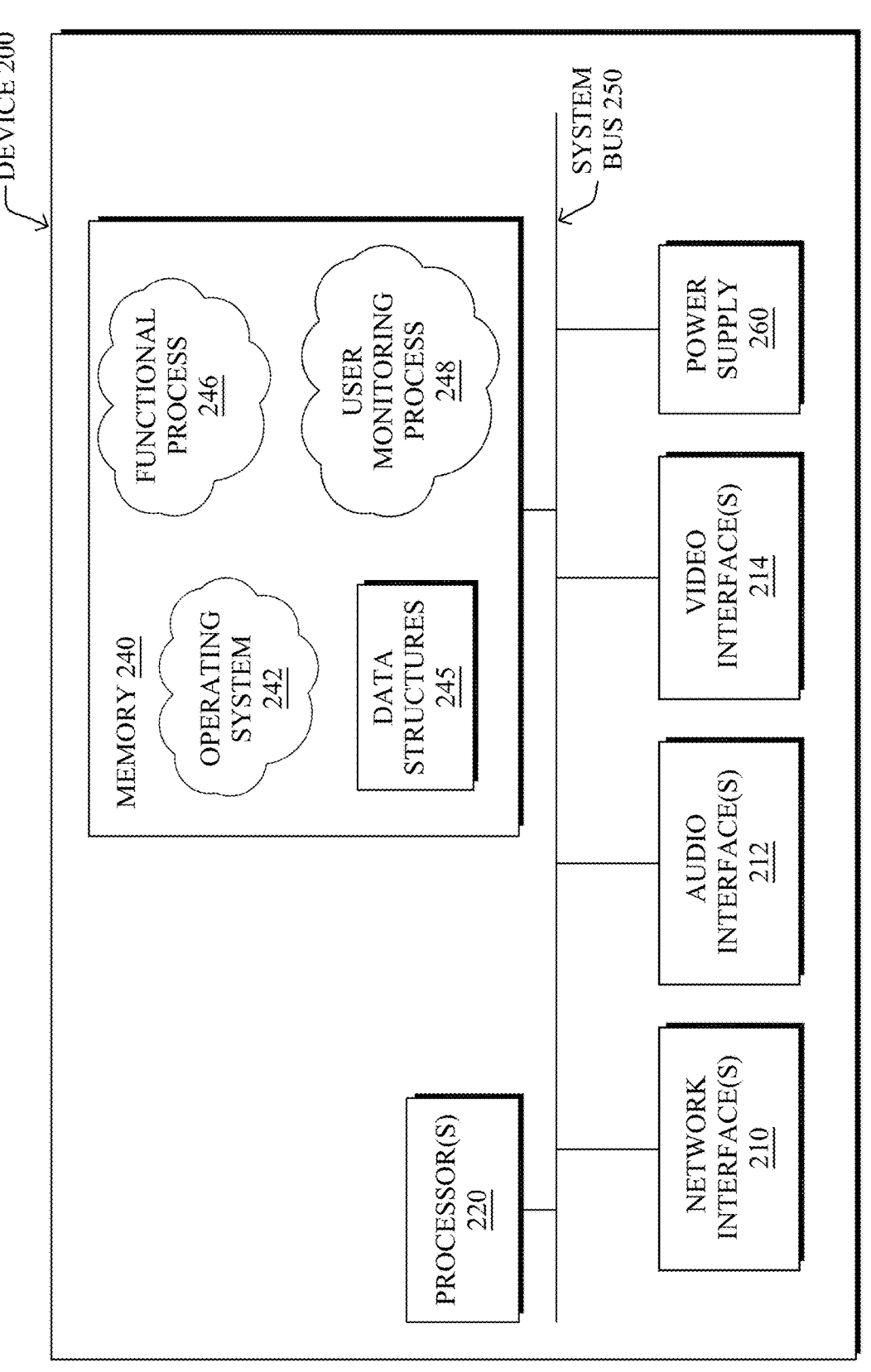
FIG. 2 illustrates an example network device/node.

FIG. 2 is a schematic block diagram of an example node/device 200 that may be used with one or more embodiments described herein, e.g., as any of the devices 102-106 shown in FIG. 1 above. Device 200 may also be any other suitable type of device depending upon the type of network architecture in place, such as a collaboration endpoint, "receiver" (herein), etc. Device 200 may comprise one or more network interface 210, one or more audio interfaces 212, one or more video interfaces 214, one or more processors 220, and a memory 240 interconnected by a system bus 250, and is powered by a power supply 260.

The network interfaces 210 include the mechanical, electrical, and signaling circuitry for communicating data over physical links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

The audio interfaces 212 may include the mechanical, electrical, and signaling circuitry for transmitting and/or receiving audio signals to and from the physical area in which device 200 is located. For instance, audio interfaces 212 may include one or more speakers and associated circuitry to generate and transmit soundwaves. Similarly, audio interfaces 212 may include one or more microphones and associated circuitry to capture and process soundwaves.

The video interfaces 214 may include the mechanical, electrical, and signaling circuitry for displaying and/or capturing video signals. For instance, video interfaces 214 may include one or more display screens. At least one of the display screens may comprise a touch screen, such as a resistive touchscreen, a capacitive touchscreen, an optical touchscreen, or other form of touchscreen display, to allow a user to interact with device 200. In addition, video interfaces 214 may include one or more cameras, allowing device 200 to capture video of a user for transmission to a remote device via network interfaces 210. Such cameras may be mechanically controlled, in some instances, to allow for repositioning of the camera, automatically.

The memory 240 comprises a plurality of storage locations that are addressable by the processor(s) 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative user monitoring process (e.g., user monitoring process 248), as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

For web-based conferencing services, such as a videoconference, teleconference, one-on-one (e.g., VoIP) calls, and so on, functional process 246 may be configured to allow device 200 to participate in a virtual meeting/conference during which, for example, audio data captured by audio interfaces 212 and optionally video data captured by video interfaces 214 is exchanged with other participating devices of the virtual meeting (or a videoconference) via network interfaces 210. In addition, conferencing processes may provide audio data and/or video data captured by other participating devices to a user via audio interfaces 212 and/or video interfaces 214, respectively. As would be appreciated, such an exchange of audio and/or video data may be facilitated by a web conferencing service (e.g., Webex by Cisco Systems, Inc., etc.) that may be hosted in a data center, the cloud, or the like.

Figure 3:
FIG. 3 illustrates various example components of an illustrative videoconferencing system.

For instance, FIG. 3 illustrates an example meeting room 300 in which a collaboration endpoint 302 is located, according to various embodiments. During operation, collaboration endpoint 302 may capture video via its one or more cameras 308, audio via one or more microphones, and provide the captured audio and video to any number of remote locations (e.g., other collaboration endpoints) via a network. Such videoconferencing may be achieved via a videoconferencing/management service located in a particular data center or the cloud, which serves to broker connectivity between collaboration endpoint 302 and the other endpoints for a given meeting. For instance, the service may mix audio captured from different endpoints, video captured from different endpoints, etc., into a finalized set of audio and video data for presentation to the participants of a virtual meeting (or a videoconference). Accordingly, collaboration endpoint 302 may also include a display 304 and/or speakers 306, to present such data to any virtual meeting (or a videoconference) participants located in meeting room 300.

Also as shown, a control display 310 may also be installed in meeting room 300 that allows a user to provide control commands for collaboration endpoint 302. For instance, control display 310 may be a touch screen display that allows a user to start a virtual meeting, make configuration changes for the videoconference or collaboration endpoint 302 (e.g., enabling or disabling a mute option, adjusting the volume, etc.).

In some cases, any of the functionalities of collaboration endpoint 302, such as capturing audio and video for a virtual meeting (or a videoconference), communicating with a videoconferencing service, presenting videoconference data to a virtual meeting participant, etc., may be performed by other devices, as well. For instance, a personal device such as a laptop computer, desktop computer, mobile phone, tablet, or the like, may be configured to function as an endpoint for a videoconference (e.g., through execution of a videoconferencing client application), in a manner similar to that of collaboration endpoint 302.

Figure 4:
FIG. 4 illustrates an example display of a virtual meeting (or a videoconference)

In addition, FIG. 4 illustrates an example display 400 of a virtual meeting (or a videoconference), according to various embodiments. As shown, video for participants 402 may be presented in conjunction with that of a presenter 404. For instance, video data for each of participants 402 (e.g., video captured by each of their respective cameras) may be presented along the bottom of the displayed conference, along a side of the displayed conference, or the like. Typically, the host or presenter of the videoconference, may be displayed in a prominent location on screen, with their video appearing much larger than that of participants 402. This may be considered a stage or presenter mode of the virtual meeting. However, other presentation modes are contemplated, for instance, where each participant shares an equal amount of the displayed conference, or where the current speaker is shown in the prominent view.

Other styles, configurations, and operations of web conferences, presentations, calls, and so on may be understood by those skilled in the art, and those shown and described above are merely examples that are not meant to be limiting to the scope of the present disclosure.

Computer Vision Driven Actions Based on User Availability

As noted above, meeting attendees for video conferences often step away temporarily without taking any action to secure their audio or video position. This can result in security, data privacy, and/or personal, or otherwise sensitive, information leaks. For example, if someone walks away for a short personal call without muting, the call details can end up in the meeting audio. The occurrence of undesirable incidents has increased dramatically in the past few years, particularly due to the increase in at-home working, and video conferencing systems have not yet provided an intelligent solution, and traditionally behave the same regardless of a whether or not a user is in front of the device.

The techniques herein, therefore, provide for computer vision driven actions based on user availability during video conferences. In particular, techniques herein provide a system to enhance user privacy and minimize unintended consequence based on a user's temporary absence or distraction during a collaboration session. As described herein, the techniques may detect unintended behavior during a meeting such as leaving the workstation without muting in order to avoid well-documented issues such as family privacy (e.g., children in the background), coffee breaks, sensitive information (e.g., conversations or phone calls), etc. That is, as described in greater detail below, therefore, by detecting whether people are present or paying attention, the techniques herein can take appropriate actions, such as muting microphones, showing banners that indicate the person is currently away, and so on.

Illustratively, the techniques described herein may be performed by hardware, software, and/or firmware, such as in accordance with the user monitoring process 248, which may include computer executable instructions executed by the processor 220 to perform functions relating to the techniques described herein, e.g., in conjunction with other processes, such as conferencing processes, etc. Notably, the techniques herein may be performed locally (e.g., on a user device) or on conference servers (e.g., receiving the data from the user devices), or any combination thereof.

Operationally, the techniques herein are focused on the following key items:

if people are present;

where they are looking; and how far from the camera they are.

Figure 5:
FIG. 5 illustrates an example of facial recognition and orientation.

Note that 3D head pose detection from a video pipeline 500 shown in FIG. 5 can be used to determine direction of attention, however the techniques herein do not suggest relying on this alone and instead combine it with the other factors listed above and detailed below. The reason for this is that typically users look around in meetings and a simple change of head pose alone does not indicate being away from the workstation. It may however be a good lead indicator, e.g., looking at a distraction to the left followed by movement to the left.

Figure 6:
FIG. 6 illustrates an example of a user gesture recognition.

Optionally the user may indicate by gesture that they are stepping away by a hand raise, wave or raised finger gesture (give me a sec type gesture) as shown in image 600 of FIG. 6.

Figure 7:
FIG. 7 illustrates an example of distance measurements of a user.

Distance from the camera may also be used to determine that a user has left their work position, e.g., when a face was detected, but is now no longer detected. The techniques herein may also identify an empty seat. For example, the image 700 of FIG. 7 shows that the user has moved back from the camera compared to the frame shown in image 600 of FIG. 6.

Figure 8:
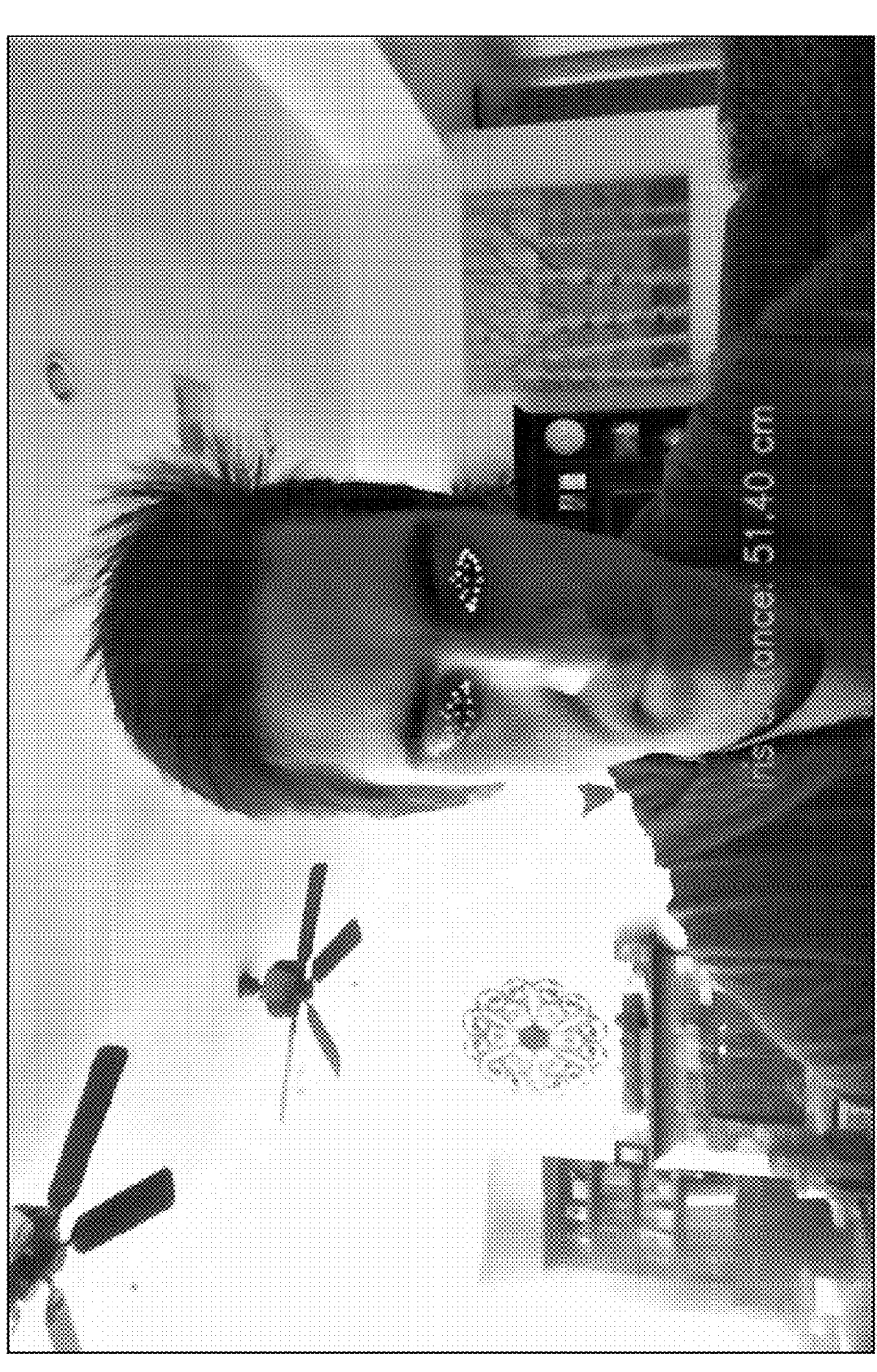
FIG. 8 illustrates an example of iris detection.

The distance from camera can be measured using a number of techniques including Iris measurement by mapping iris size in pixels to iris size in mm. This is shown in image 800 of FIG. 8. If the iris is not visible, the techniques herein can use the relative size of the face based on the detected face box. (As an example, the techniques herein can create a dataset in real-time that associates the distance calculated with the iris and the respective head size in order to make the face box distance calculation more robust.)

In response to detecting "user availability" (e.g., presence, attention, distraction, and so on), the techniques herein may correspondingly result in an automatic (e.g., user configured or default) set of actions. Such actions may include, but are not limited to, muting, stopping video, blurring video, replacing video with an image/icon or otherwise setting a full background augmentation, etc., or combinations thereof, such as muting and setting a "BRB" (Be Right Back) sticker as shown in the image 900 of FIG. 9.

The result is that no audio or video contamination will occur in the meeting and the user is in control of the behavior when they step away.

Notably, distance from device, direction of travel, and measurement of movement are good leaving/returning indicators, and provide extra indicators adding to the robustness of the solution herein. For example, when a user is detected as moving towards the edge of a video feed frame (e.g., an outer boundary of what is visible within a video feed frame) this may be an indication and/or confirmation that the user is purposefully traversing out of the view of a camera. Further, the speed of a movement may be measured by tracking the acceleration of, for example, a user's face within the outer boundary of the frame and inferring that the higher the velocity of movement the more purposeful, etc. For instance, the greater velocity with which a user travels toward the edge of the video frame, the more likely that user is purposefully traversing out of the view of a camera.

The solutions herein also extend to more complex use cases like detecting sidebar conversations using gaze detection. For example, merely looking to the side might be associated with one level of engagement, while looking to the side and speaking while on mute might be further indicative of a side conversation occurring off camera, and thus may result in an even lower level of engagement. Other algorithms for determining levels of engagement, as well as confidence in such engagement determinations, may also be made in accordance with one or more embodiments of the techniques herein.

An additional consideration leverages existing face recognition solutions to determine that those people in the frame are expected to be in the frame. In this scenario, face recognition can be used to determine that people not on the roster are in the meeting, and as a result the techniques herein may trigger a foreground and background augmentation. The target use case for this scenario is a user at home walking away and a family member sitting at the workstation or kids playing in the background.

Note again that the techniques herein may be an automatic feature, but in certain embodiments the user has sufficient controls to both override the action taken in real-time and preferences to set what action(s) is (are) taken in a given situation.

Figure 9:
FIG. 9 illustrates an example of a computer vision driven action based on user availability during video conferences.
Figure 9:

FIG. 9 illustrates an example of an image 900 of a BRB sticker that may be displayed as a video conference privacy measure when a device enters a "BRB" (be right back) mode in response to a level of engagement of a user being below a given threshold of engagement for the minimum length of time. For example, a process may be utilized whereby all of the faces in a frame are identified and a determination is made whether or not to trigger a BRB mode based on one or more of a distance of the detected face (TargetFace), head pose of the detected face: (TargetFace). In this process, detecting no faces may be treated the same was as if the closest face as at an infinite distance and/or not looking at the screen.

In various embodiments, the process may include initialization. At the start time it may not be known how far the closest face (TargetFace) should be in order to trigger BRB mode. The process may collect n frames (e.g., the hyperparameter n may be called init_window_length) and average the distance to all the closest faces through the first n frames. This value may become the reference distance (RefDistance).

The process may then proceed to the running of a state machine to determine the occurrence and/or duration of one or more engagement indicators. For instance, after initialization is completed, the process may look for TargetFace in the frame and compare the distance of TargetFace with RefDistance. In addition, the head pose of a target may be analyzed and it may be detected whether the head pose is tilted enough to state that the person is not paying attention. This may be accomplished by defining a max offset degree for yaw, pitch, roll (MaxOffsetHeadPose). If the current distance is equal to or greater than distance_ratio_xRefDistance, an onDistanceCounter counter may be started. If the current head pose triggers the boolean notLooking, then the onPoseCounter counter may be started.

These counters may check for how long the signal for enabling BRB has been on. The moment either counter reaches a set number, the techniques herein enable BRB. A hyperparameter on_histeresis_distance_max_ms_ may define how long to wait (e.g., a minimum length of time) to enable BRB after TargetFace has been detected far enough with regard to RefDistance.

A hyperparameter on_histeresis_pose_max_ms_ may define how long to wait (e.g., a minimum length of time) to enable BRB after TargetFace has been detected not to be paying attention.

Disabling the BRB mode may operate under the same logic. For instance, when TargetFace is at a distance smaller than distance_ratio_x RefDistance, the offDistanceCounter counter may be started. When TargetFace's pose is defined to be looking at the camera based on MaxOffsetHeadPose the offPoseCounter counter may be started.

A hyperparameter off_histeresis_distance_max_ms_ may define how long to wait (e.g., a minimum length of time) to disable BRB after TargetFace has been detected close enough with regard to RefDistance. A hyperparameter off_histeresis_pose_max_ms_ may define how long to wait (e.g., a minimum length of time) to enable BRB mode after TargetFace has been detected not to pay attention.

RefDistance may be constantly updated during each session in order to accommodate the fact that users might slowly get closer or farther from the camera. The distance at which events are triggered may therefore be dynamic.

Figure 10:
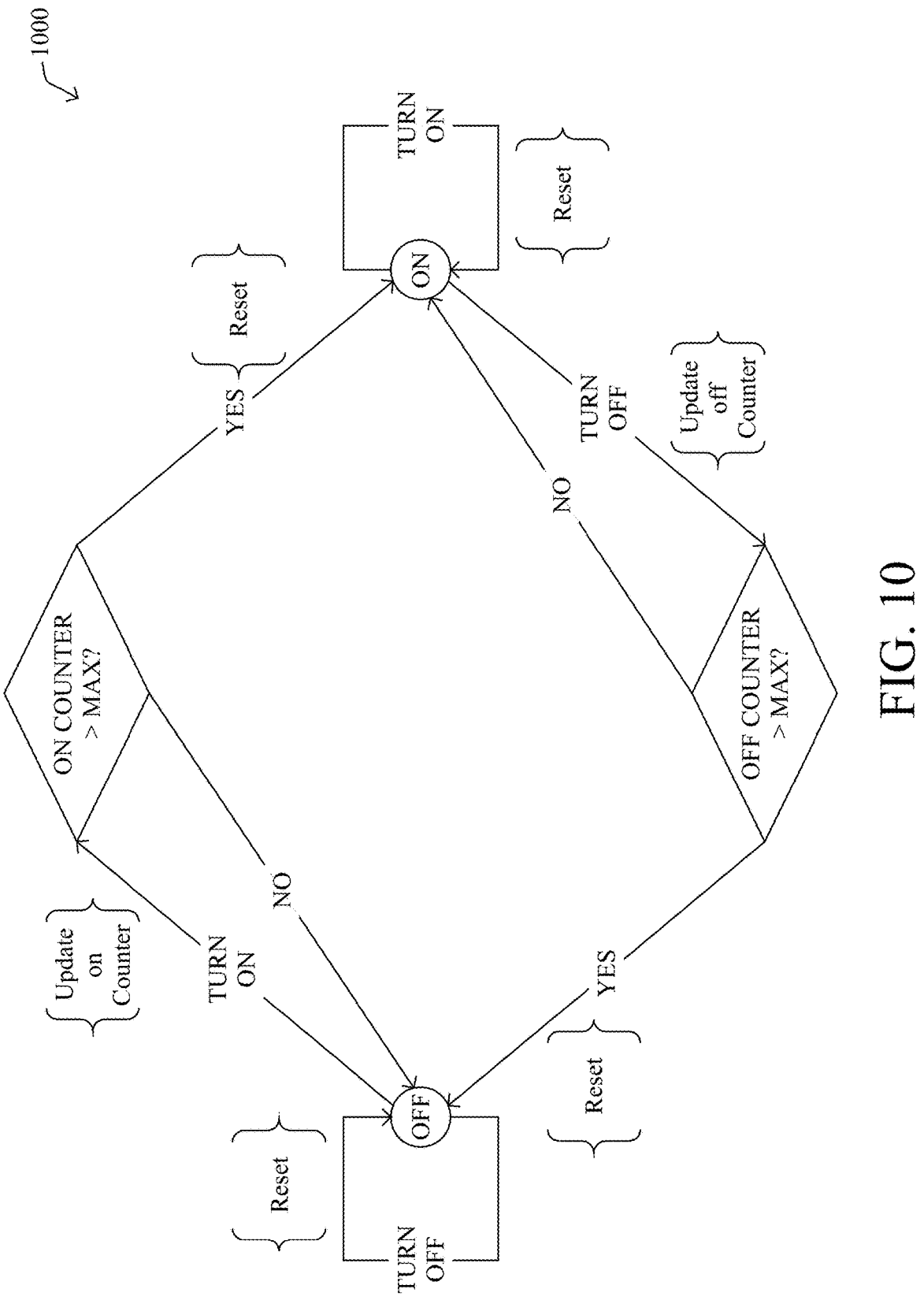
FIGS. 10-11 illustrate example state machines for activation and deactivation according to one or more embodiments herein.
Figure 11:
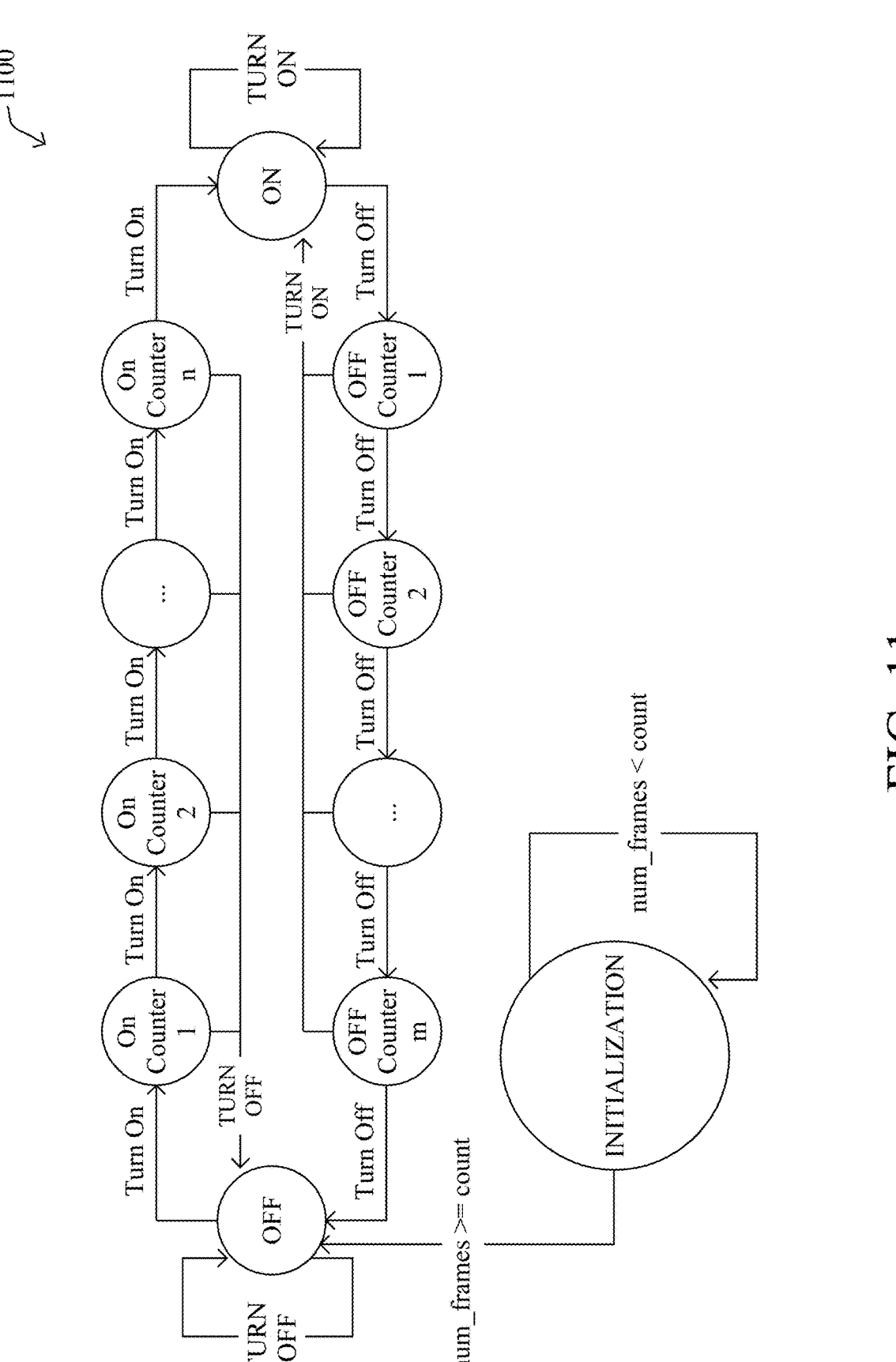

Note that the diagrams 1000 and 1100 shown in FIGS. 10-11 illustrate example state machines for activation and deactivation according to one or more embodiments herein, as may be appreciated by those skilled in the art.

In various embodiments, the activation and/or deactivation of video conference privacy measures may be based on the level of engagement of a user to a video conference. The video privacy measures may include blurring user video input to the video conference; stopping user video input to the video conference; replacing user video input to the video conference; muting user audio input to the video conference, etc.

The level of engagement may be determined based on one or more engagement indicators. For example, user body presence; user face presence; user eye gaze direction; user distance; user hand gesture; empty seat presence; user body movement; user speaking level; and background noise may be utilized to determine a level of engagement of a user.

In various embodiments, one or more video privacy measures may be enacted in response to detecting the level of engagement being below the given threshold of engagement for the minimum length of time. That minimum length of time may be a configurable amount of time. This may mean that a user may configure the length of time that their level of engagement is below the given threshold of engagement before the privacy measure is triggered.

Additionally, or alternatively, the minimum length of time may be automatically reconfigured in response to detecting on one or more particular engagement indicators. For example, as previously noted direction of travel and/or measurement of movement may serve as good leaving/returning indicators. As such, movement data engagement indicators such as direction of travel, velocity of travel, etc. may be utilized to infer purposefulness of movement and/or intention and therefore may be utilized to reconfigure the minimum length of time accordingly.

For example, if a user is moving towards the edge of a video frame prior to failing to detect their face, this may serve as an indication that they did move out of frame and/or that the move was purposeful. Based on this inference, the minimum length of time may be reduced in order to account for the likelihood that the user moved out of frame.

Alternatively, if no movement towards the edge of the frame was detected prior to failing to detect a user's face, then it may be inferred that it is possible the user did not purposefully leave the frame and/or that a face detection failure may be responsible for the absence instead. Accordingly, based on this inference, the minimum length of time may be increased in order to account for the likelihood that the user is still in frame.

Likewise, the velocity of movement may serve as an engagement indicator that can be used as the basis of minimum length of time changes. For instance, if a user is moving towards the edge of a video frame at velocity consistent with purposefully exiting the frame prior to failing to detect their face, this may serve as an indication that they did move out of frame and/or that the move was purposeful. Based on this inference, the minimum length of time may be reduced in order to account for the likelihood that the user moved out of frame.

Alternatively, if the velocity of movement towards the edge of the frame detected prior to failing to detect a user's face was significantly faster or significantly slower than the velocity consistent with purposefully exiting the frame, then it may be inferred that it is possible the user did not purposefully leave the frame and the absence is likely a momentary or accidental one that will be corrected. Accordingly, based on this inference, the minimum length of time may be increased in order to account for the likelihood that the user will likely return to the frame.

Essentially, video privacy measures may be triggered in response to real-time, dynamic assessment of level of engagement and corresponding real-time dynamic adjustment of a reaction time based on that level of engagement (and corresponding confidence, etc.). That is, the amount of time or how long a user's level of engagement is below a given threshold before it triggers a video privacy measure may be dynamically adjusted based on the detection of particular engagement indicators that provide a higher confidence level that any subsequently detected engagement indicators are more or less likely to be indicative of a level of engagement of the user thereby facilitating a corresponding trigger threshold adjustment.

For example, when the particular engagement indicators indicate that subsequently detected engagement indicators are less likely to be accurately indicative of a level of engagement within a threshold amount of time than before the detection of the particular engagement indicators, then that threshold amount of time may be extended to provide that additional amount of time and/or data collection to make an accurate assessment of the level of engagement. Alternatively, when the particular engagement indicators indicate that subsequently detected engagement indicators are more likely to be accurately indicative of a level of engagement within a threshold amount of time than before the detection of the particular engagement indicators, then that threshold amount of time may be shortened to reduce the amount of time and/or data collection involved in making an accurate assessment of the level of engagement.

That is, in contrast to binary approaches where a detection equals an engagement level and/or is compared to a static duration threshold, these techniques incorporate an appreciation that some actions or properties of those actions (e.g., direction of movement, velocity of movement, etc.) may actually be stronger indicators of engagement and/or the meaning of subsequent engagement indicators than others and can be used to condense the amount of time and/or data that must be collected before making a determination regarding engagement. Therefore, these techniques may incorporate intelligent and dynamic adaptation of the privacy measure triggering thresholds. By inferring intent and/or reliability of subsequent engagement indicators from certain actions of the user, the amount of time and data that it takes to recognize that a user is no longer engaged with the video conference can be reduced when the actions suggest it is appropriate. At the same time, the amount of time and data that it takes to recognize that a user is no longer engaged with the video conference can be increased when the actions suggest it is appropriate. Therefore, greater accuracy and quicker decision making in triggering privacy measures may be achieved.

Figure 12:
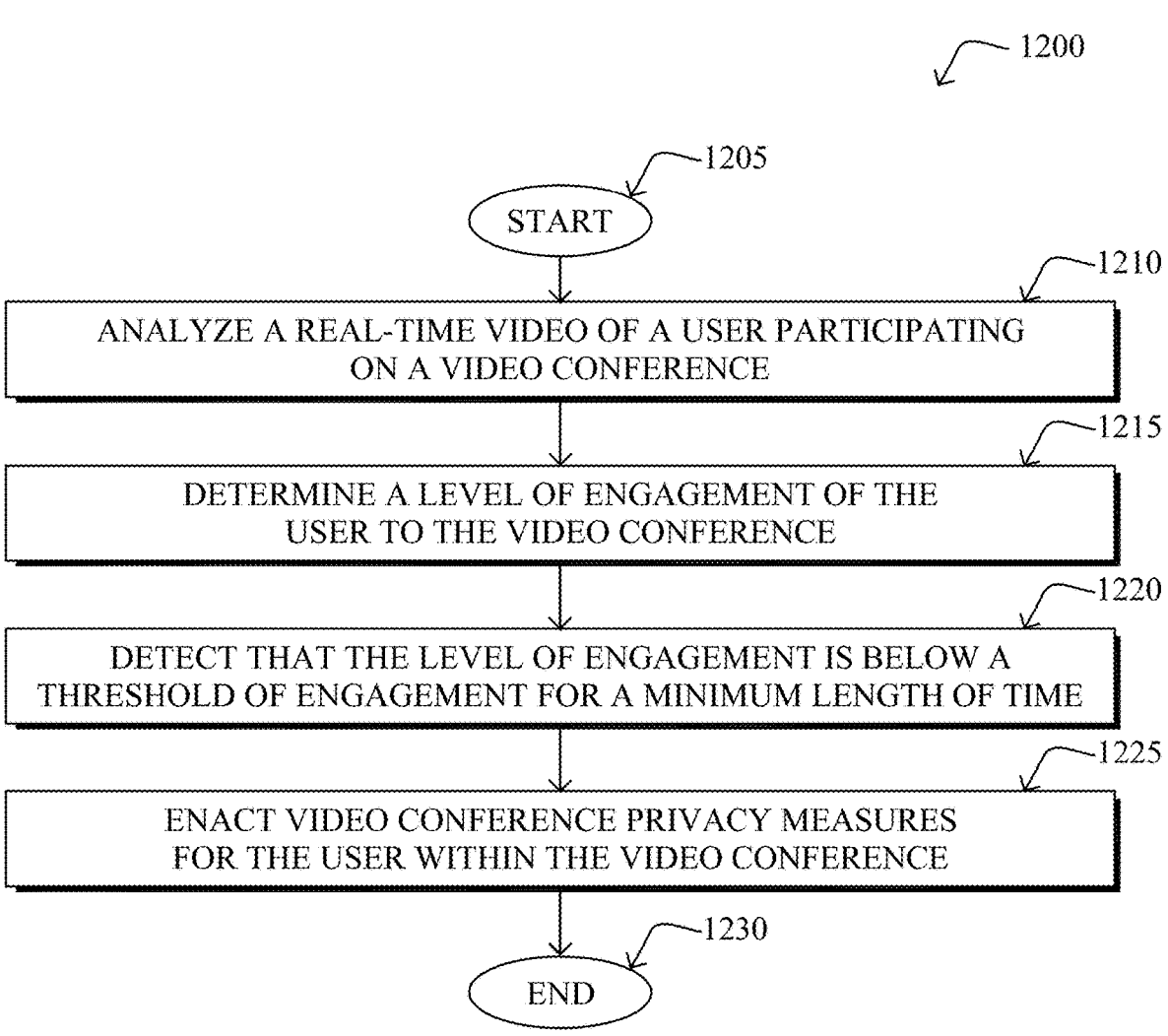
FIG. 12 illustrates an example simplified procedure for computer vision driven actions based on user availability during video conferences.

FIG. 12 illustrates an example simplified procedure (e.g., method) for computer vision driven actions based on user availability during video conferences, in accordance with one or more embodiments described herein. For example, a non-generic, specifically configured device (e.g., device 200) may perform procedure 1200 by executing stored instructions (e.g., user monitoring process 248). Procedure 1200 may start at step 1205, and continue to step 1210, where, as described in greater detail above, real-time video of a user participating on a video conference may be analyzed.

At step 1215, as detailed above, a level of engagement of the user to the video conference may be determined based on the analysis of the real-time video of a user participating on a video conference. The level of engagement may be determined based on one or more engagement indicators. The engagement indicators may include user body presence, user face presence, user eye gaze direction, user distance, user hand gesture, empty seat presence, user body movement, user speaking level, and/or background noise.

In addition, procedure 1200 may involve ensuring that a person on camera at a device of the user is the user based on facial recognition. In such instances, the level of engagement of the user may be based on ensuring that the person is the user.

At step 1220, the level of engagement of the user to the video conference may be detected as being below a given threshold of engagement for a minimum length of time. The minimum length of time may be configurable. For example, the minimum length of time may be automatically reduced from an original minimum length of time based on detected movement of the user toward an edge of a video frame. In various embodiments, the minimum length of time may be based on a confidence of the level of engagement.

As detailed above, at step 1225 one or more video conference privacy measures may be enacted for the user within the video conference in response to the level of engagement being below the given threshold of engagement for the minimum length of time. The one or more video conference privacy measures may be enacted based on a confidence of the level of engagement. The confidence of the level of engagement may be based on one or more engagement indicators.

The one or more video conference privacy measures may include blurring user video input to the video conference, stopping user video input to the video conference, replacing user video input to the video conference, and/or muting user audio input to the video conference. In various embodiments, the one or more video conference privacy measures may be user-configured. In addition, procedure 1200 may involve preventing one or both of video output or audio output from the video conference in response to the person not being the user.

Procedure 1200 may end at step 1230.

It should be noted that while certain steps within procedure 1200 may be optional as described above, the steps shown in FIG. 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for computer vision driven actions based on user availability during video conferences. That is, the techniques herein provide a system to enhance user privacy and minimize unintended consequence based on a user's temporary absence or distraction during a collaboration session. Notably, room interpretation is known to determine objects in a space, gaze detection is an existing technology, camera distance measurements are known, and face detection exists to determine presence of a number of human faces in a given frame. However, none of the current collaboration applications determine actions to take on behalf of a user to avoid undesirable incidents, as in the present disclosure.

Moreover, previous concepts of user presence focus on detecting any presence in the room. As such, they do not differentiate between someone present and interacting with the conference, and someone who is present but not interacting. With the techniques herein, the process can know that someone is still in the room but not attending to the call, and thus appropriate actions can be taken (e.g., blurring, muting, etc.). That is, the techniques herein specifically aim to give someone privacy when they leave the attention bubble of a video conference.

Note, too, that new techniques may be used herein to combine the measurements needed to implement resulting features such as direction of gaze and distance measurements in a single machine learning model.

In particular, the techniques herein may employ any number of machine learning (ML) and/or artificial intelligence (AI) techniques, such as to enhance audio based on one or more audio enhancement models, as described herein. In general, machine learning is concerned with the design and the development of techniques that receive empirical data as input (e.g., audio streams, herein), recognize complex patterns in the input data, and optionally make adjustments to the data (e.g., enhancing the data, filling in missing data, changing the data, etc.). For example, some machine learning techniques use an underlying model, which is trained to perform certain operations (e.g., classifying data, adjusting data, and so on). A learning process adjusts parameters of the model such that after this optimization/learning phase, the model can be applied to input data sets to perform the desired functionality.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, deep neural networks (DNNs), or the like.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as such as for videoconferencing services, other suitable technologies, protocols, and associated devices may be used in accordance with the techniques described above, such as one-on-one video communication protocols (e.g., video calls). In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

According to the embodiments herein, an illustrative method herein may comprise: analyzing, by a process, real-time video of a user participating on a video conference; determining, by the process and based on analyzing, a level of engagement of the user to the video conference; detecting, by the process, that the level of engagement of the user to the video conference is below a given threshold of engagement for a minimum length of time wherein the minimum length of time is configurable based on one or more engagement indicators; and enacting, by the process, one or more video conference privacy measures for the user within the video conference in response to the level of engagement being below the given threshold of engagement for the minimum length of time.

In one embodiment, enacting the one or more video conference privacy measures is further based on a confidence of the level of engagement. In one embodiment, the confidence of the level of engagement is based on one or more engagement indicators. In one embodiment, the level of engagement is based on one or more engagement indicators selected from a group consisting of: user body presence; user face presence; user eye gaze direction; user distance; user hand gesture; empty seat presence; user body movement; user speaking level; and background noise. In one embodiment, wherein the one or more video conference privacy measures are selected from a group consisting of: blurring user video input to the video conference; stopping user video input to the video conference; replacing user video input to the video conference; and muting user audio input to the video conference. In one embodiment, the one or more video conference privacy measures are user-configured. In one embodiment, the minimum length of time is reduced from an original minimum length of time based on detected movement of the user toward an edge of a video frame. In one embodiment, the minimum length of time is based on a confidence of the level of engagement. In one embodiment, the method further comprises: ensuring that a person on camera at a device of the user is the user based on facial recognition. In one embodiment, the level of engagement of the user is based on ensuring that the person is the user. In one embodiment, the method may further comprise preventing one or both of video output or audio output from the video conference in response to the person not being the user.

According to the embodiments herein, an illustrative tangible, non-transitory, computer-readable medium herein may have computer-executable instructions stored thereon that, when executed by a processor on a computer, cause the computer to perform a method comprising: analyzing real-time video of a user participating on a video conference; determining, based on analyzing, a level of engagement of the user to the video conference; detecting that the level of engagement of the user to the video conference is below a given threshold of engagement for a minimum length of time wherein the minimum length of time is configurable based on one or more engagement indicators; and enacting one or more video conference privacy measures for the user within the video conference in response to the level of engagement being below the given threshold of engagement for the minimum length of time.

According to the embodiments herein, an illustrative apparatus herein may comprise: one or more network interfaces to communicate with a network; a processor coupled to the one or more network interfaces and configured to execute one or more processes; and a memory configured to store a process that is executable by the processor, the process, when executed, configured to: analyze real-time video of a user participating on a video conference; determine, based on analyzing, a level of engagement of the user to the video conference; detect that the level of engagement of the user to the video conference is below a given threshold of engagement for a minimum length of time wherein the minimum length of time is configurable based on one or more engagement indicators; and enact one or more video conference privacy measures for the user within the video conference in response to the level of engagement being below the given threshold of engagement for the minimum length of time.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:

analyzing, by a process, real-time video of a user participating on a video conference;

determining, by the process and based on analyzing, a level of engagement of the user to the video conference;

determining, by the process, a confidence level in an accuracy of the level of engagement based on one or more engagement indicators;

detecting, by the process, that the level of engagement of the user to the video conference is below a given threshold of engagement for a minimum length of time, wherein the minimum length of time is automatically adjusted based on the confidence level in the level of engagement; and enacting, by the process, one or more video conference privacy measures for the user within the video conference in response to the level of engagement being below the given threshold of engagement for the minimum length of time.

2. The method as in claim 1, wherein enacting the one or more video conference privacy measures is further based on a confidence of the level of engagement.

3. The method as in claim 2, wherein the confidence of the level of engagement is based on the one or more engagement indicators.

4. The method as in claim 1, wherein the level of engagement is based on the one or more engagement indicators selected from a group consisting of: user body presence; user face presence; user eye gaze direction; user distance; user hand gesture; empty seat presence; user body movement; user speaking level; and background noise.

5. The method as in claim 1, wherein the one or more video conference privacy measures are selected from a group consisting of: blurring user video input to the video conference; stopping user video input to the video conference; replacing user video input to the video conference; and muting user audio input to the video conference.

6. The method as in claim 1, wherein the one or more video conference privacy measures are user-configured.

7. The method of claim 1, wherein the minimum length of time is reduced from an original minimum length of time based on detected movement of the user toward an edge of a video frame.

8. The method of claim 1, wherein the confidence level is determined based on a predictive accuracy of the one or more engagement indicators.

9. The method of claim 1, further comprising:

ensuring that a person on camera at a device of the user is the user based on facial recognition.

10. The method of claim 9, wherein the level of engagement of the user is based on ensuring that the person is the user.

11. The method of claim 10, further comprising:

preventing one or both of video output or audio output from the video conference in response to the person not being the user.

12. A tangible, non-transitory, computer-readable medium having computer-executable instructions stored thereon that, when executed by a processor on a computer, cause the computer to perform a method comprising:

analyzing real-time video of a user participating on a video conference;

determining, based on analyzing, a level of engagement of the user to the video conference;

determining a confidence level in an accuracy of the level of engagement based on one or more engagement indicators;

detecting that the level of engagement of the user to the video conference is below a given threshold of engagement for a minimum length of time, wherein the minimum length of time is automatically adjusted based on the confidence level in the level of engagement; and enacting one or more video conference privacy measures for the user within the video conference in response to the level of engagement being below the given threshold of engagement for the minimum length of time.

13. The method as in claim 12, wherein enacting the one or more video conference privacy measures is further based on a confidence of the level of engagement.

14. The method as in claim 13, wherein the confidence of the level of engagement is based on the one or more engagement indicators.

15. The method as in claim 12, wherein the level of engagement is based on one or more engagement indicators selected from a group consisting of: user body presence; user face presence; user eye gaze direction; user distance; user hand gesture; empty seat presence; user body movement; user speaking level; and background noise.

16. The method as in claim 12, wherein the one or more video conference privacy measures are selected from a group consisting of: blurring user video input to the video conference; stopping user video input to the video conference; replacing user video input to the video conference; and muting user audio input to the video conference.

17. The method of claim 12, wherein the one or more video conference privacy measures are user-configured.

18. The method of claim 12, wherein the minimum length of time is reduced from an original minimum length of time based on detected movement of the user toward an edge of a video frame.

19. The method of claim 12, wherein the minimum length of time is automatically increased when the confidence level indicates a low predictive accuracy of the one or more engagement indicators and wherein the minimum length of time is automatically decreased when the confidence level indicates a high predictive accuracy of the one or more engagement.

20. An apparatus, comprising:

one or more network interfaces to communicate with a network;

a processor coupled to the one or more network interfaces and configured to execute one or more processes; and a memory configured to store a process that is executable by the processor, the process, when executed, configured to:

analyze real-time video of a user participating on a video conference;

determine, based on analyzing, a level of engagement of the user to the video conference;

determine a confidence level in an accuracy of the level of engagement based on one or more engagement indicators;

detect that the level of engagement of the user to the video conference is below a given threshold of engagement for a minimum length of time, wherein the minimum length of time is automatically adjusted based on the confidence level in the level of engagement; and enact one or more video conference privacy measures for the user within the video conference in response to the level of engagement being below the given threshold of engagement for the minimum length of time.

\* \* \* \* \*